April 28, 1925. 1,535,384
F. A. TONEY
TRACTOR
Filed Feb. 9, 1923 2 Sheets-Sheet 1
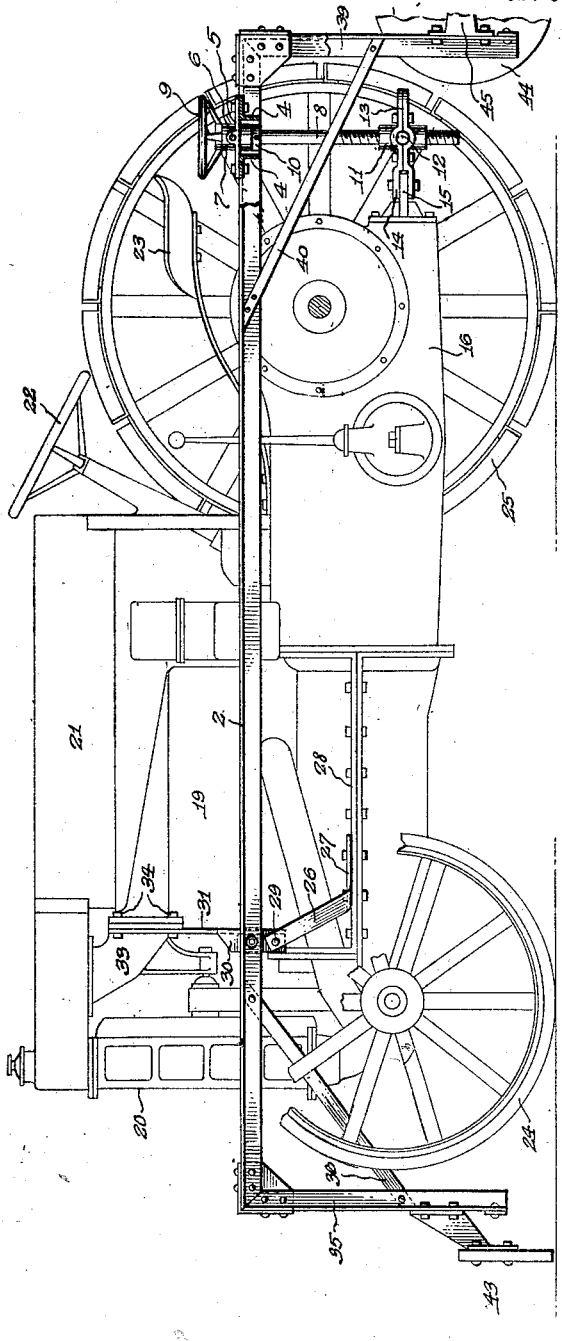
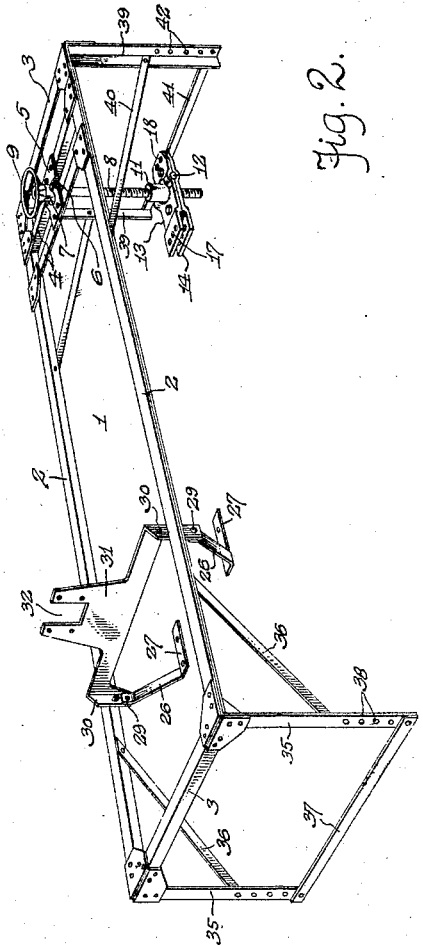
Inventor
Frederick A. Toney,
By
Attorneys April 28, 1925.
F. A. TONEY
TRACTOR
Filed Feb. 9, 1923
1,535,384
2 Sheets-Sheet 2
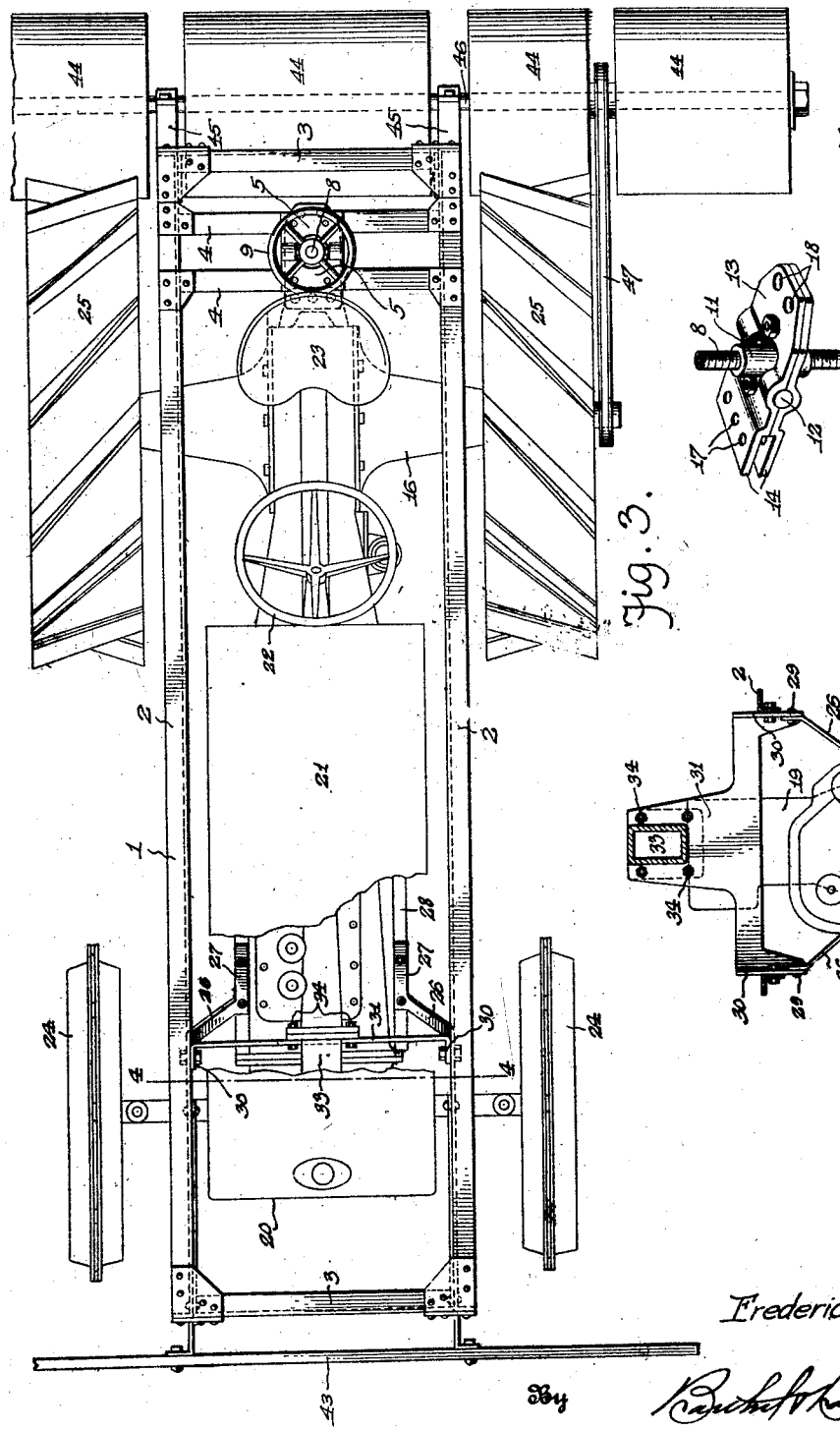
Inventor
Frederick A. Toney,
By
Attorneys Patented Apr. 28, 1925.

1,535,384

UNITED STATES PATENT OFFICE.

FREDERICK A. TONEY, OF DETROIT, MICHIGAN.

TRACTOR.

Application filed February 9, 1923. Serial No. 617,911.

*To all whom it may concern:*

Be it known that I, FREDERICK A. TONEY, a citizen of the United States of America, residing at Detroit, in the county of Wayne and State of Michigan, have invented certain new and useful Improvements in Tractors, of which the following is a specification, reference being had therein to the accompanying drawings.

This invention relates to an attachment for tractors whereby various forms of farm implements may be operated by tractors of the usual construction, and the object of the present invention is to provide a simple, cheap and efficient device for the purpose which may be quickly and easily applied to motor driven tractors of common construction, the tractor thereby providing supporting and carrying means for farm implements, and thus obviating the necessity for ground wheels for implements which are commonly provided with such wheels.

A further object is to provide an attachment having adjusting means whereby the same may be adjusted relative to the tractor and the farm implement attached thereto adjusted therewith.

A further object is to provide an attachment which is so constructed and arranged as to make it particularly adaptable for the connection thereto of various forms of farm implements and machines to be carried, drawn or fastened by the tractor, and which attachment may be operated, when used in connection with certain forms of implements, to put a load on the implement, transferring part or all of the weight of the rear end of the tractor from its driving wheels to such implement.

It is also an object to provide certain other new and useful features in the construction and arrangement, all as hereinafter more fully described.

With the above and other ends in view, the invention consists in the matters hereinafter set forth and more particularly pointed out in the appended claims, reference being had to the accompanying drawings in which Figure 1 is a side elevation of a device or attachment embodying the invention and showing the same as applied to a tractor of a well known type;

Fig. 2 is a perspective view of the device detached;

Fig. 3 is a plan view of the device showing the manner of attaching the same to a tractor and showing the tractor in plan view;

Fig. 4 is a sectional detail substantially upon the line 4—4 of Fig. 3; and

Fig. 5 is a perspective detail of a foot plate.

In order to provide convenient means for attaching various forms of farm implements and machinery to power driven tractors of the usual construction and, in certain instances, provide rigid bearings and means for supporting and carrying such implements, devices or machines and which means is not commonly provided upon tractors to make them universally applicable for use in operating such devices, an open rectangular frame indicated as a whole by the numeral 1, is provided, said frame comprising side members 2 of angle or other suitable form in cross-section to give the necessary rigidity, and end members 3 of similar cross-section connecting the side members at the ends thereof, with a pair of cross members 4 adjacent the rear end of the frame, which cross members are connected at the longitudinal center line of the frame by a bearing plate 5 having bearings for lateral trunnions 6 on a bearing 7 for an adjusting shaft 8 provided with a hand wheel 9 on its upper end by means of which the shaft may be turned. Longitudinal movement of said shaft through said bearing 7 is prevented by said wheel engaging one end of the bearing and a collar 10 on the shaft engaging the lower end of said bearing. The lower end of the adjusting shaft 8 is screwthreaded to engage a nut 11, which nut is provided with trunnions 12 engaging bearings in a foot plate 13, one end of which is in the form of a yoke or provided with parallel ears 14 to embrace a draw-bar lug 15 provided on the rear end of the transmission and differential casing 16 of the particular tractor construction shown, said ears 14 being formed with a series of openings 17 for bolts to rigidly secure said foot plate to said lug 15 or other suitable part with which the tractor may be provided. The free end of this foot plate 13 is also formed with openings 18 to receive means for connecting a farm implement thereto to be drawn by the tractor, such as a plow, drag, wagon tongue or the like (not shown).

The frame 1, being an open frame and of greater length than the over-all length of the tractor, may be attached to the tractor with the upwardly projecting parts thereof, such as the power plant assembly comprising the engine 19, radiator 20, fuel tank 21, steering wheel 22 and driver's seat 23, extending upwardly through this frame, the side members 2 of the frame being positioned at each side of the engine longitudinally thereof between the engine and front steering wheels 24 and between the rear traction wheels 25 at each side of the driver's seat and independently of and above the front and rear wheel-axles. This frame 1 is secured to and pivotally supported upon the tractor near the forward end of the frame by providing suitably shaped bracket arms 26 to be secured in any suitable manner to the tractor, preferably, when applied to a tractor of the type shown, by forming these brackets with flat end portions 27 having a series of holes to take the bolts which secure the lower part of the engine crank case to the upper part thereof, said flat end portions resting upon the oustanding flange 28 of the crank case, which flange thus forms a rigid support and place of attachment for said brackets.

The arms 26 forming the brackets, preferably extend upwardly and outwardly toward the side members 2 of the frame 1 and at their upper ends are pivotally attached at 29 to downwardly projecting end portions or flanges 30 on the ends of a transverse supporting member 31, which is notched or shaped in the form of a yoke, as at 32 to embrace the water connection 33 at the forward end of the engine cylinders, which water connection connects the radiator with the water jacket of the cylinders, in a tractor of the construction shown. This yoke is secured to the flange of the water connection by the same bolts 34 which are used to secure the water connection to the cylinder block and therefore the frame 1 is connected to the tractor by a rigid member which in turn is rigidly secured to the tractor by bolts already provided on the tractor. The frame may therefore be quickly and easily attached to the tractor without the necessity for boring extra holes or making other changes therein in order to provide a place of pivotal attachment of the frame to the tractor. The frame 1 is thus pivoted near its forward end upon a rigid support on the tractor, and near its rear end this frame is supported by the adjusting shaft 8 carried by the frame and connected to the foot plate 13 on the rear end of the differential casing of the tractor so that by turning this adjusting shaft by means of its hand wheel 9, the frame may be pivotally adjusted about its pivotal attachment 29 to the tractor to raise or lower the rear end of the frame and likewise lower or raise the forwardly projecting forward end of the frame. A tilting adjustment of the frame longitudinally of the tractor is therefore secured for the purpose of raising or lowering implements or other devices attached to the ends of this frame, said frame being preferably provided at its forward end with a downward extension in the form of a rectangular frame comprising end posts or members 35 extending downward at the ends of the side members 2 of the frame at right angles thereto and held by braces 36 across said angle, said parts being connected at their lower ends by a cross member 37 and the frame being provided with any suitable means such as a series of holes 38 for facilitating the attachment of various forms of implements or devices thereto. The rear end of the frame 1 is also provided with a downwardly extending frame extension comprising side legs 39, braces 40, cross bar 41, and a series of holes 42, similar to the extension at the forward end.

Any suitable implement or device may therefore be conveniently attached to either one or both of the frame extensions to be carried thereby, in the drawings there being illustrated in Figs. 1 and 3 a scraper 43 as rigidly bolted to the legs 35, the bolts passing through the openings 38 and the scraper being thus made adjustable upon said forward end extension and adjustable toward and from the ground by the tilting of the frame 1 upon the tractor by means of the hand wheel 9 which is under the control of the operator. A land roller 44 is also shown as rigidly bolted to the legs 39 of the rear end extension, suitable bearing brackets 45 being provided to carry the shaft 46 upon which the roller is mounted, the roller being preferably made in sections so that it will be of greater length than the width of the tractor. This roller being carried by the frame 1 is also raised or lowered by the tilting of the frame upon the tractor, and obviously any other device or implement, such as a cultivator, hay-rake or the like (not shown), may be attached to the frame in this manner. Such implements are usually provided with supporting wheels which may be dispensed with when the implement is mounted in this manner, and implements having ground working instrumentalities which are adjustable for depth and the like, may in a like manner be attached to this frame and such instrumentalities adjusted by the tilting of the frame during the operation of the device. The invention disclosed herein consists in the provision of a carrying frame to which implements of this character may be readily attached and the usual ground wheels of such implements dispensed with.

By reason of the tilting movement of the frame 1, the devices or implements attached thereto may not only be adjusted, but, as where a land roller is carried by the rear end of said frame, a part or all of the weight of the rear end of the tractor may be transferred to such roller by the adjustment of the rear end of the frame downwardly. Further, power for operating implements carried by the frame, may be transmitted thereto from rotating parts of the tractor, as indicated in dotted lines in Fig. 3 where the roller shaft is shown as positively driven by means of a chain 47 running over a sprocket on the end of the axle of the tractor wheels 25 and over a similar sprocket on the roller shaft 46.

Those changes which may be necessary to make the attachment applicable to other forms or constructions of tractors, is contemplated and such changes in the form or construction of the frame and manner of attaching the same to a tractor and adjusting the frame, as fall within the scope of the appended claims may be made without departing from the spirit of the invention, and I do not, therefore limit myself to the particular embodiment of the invention shown.

What I claim is:—

1. An attachment for tractors having a power plant assembly supported by front and rear ground wheels mounted upon axles, said attachment including an open frame of greater length than the length of the tractor, means for attaching said frame to the tractor, with upper portions of the tractor power plant projecting upwardly through the open frame and with the side members of the frame extending longitudinally of and between the power plant and the tractor ground wheels, with said frame pivotally supported by the power plant to swing upon an axis extending transversely of the power plant, with said side members of the frame swinging in vertical planes at the sides of the power plant and extending over and beyond said front and rear axles, and means for detachably attaching implements to said frame to be operated thereby.

2. An attachment for tractors having a power plant assembly supported by front and rear ground wheels mounted upon axles, said attachment including an open frame having side members extending longitudinally of and at opposite sides of said power plant with portions of the power plant extending upwardly through the frame and with the side members of the frame extending beyond and supported above and independently of the said axles between the power plant and ground wheels, brackets rigidly secured to the power plant and pivotally connected to the side members of the frame intermediate the ends thereof for pivotally supporting the frame to swing in a vertical plane relative to the power plant, and means for attaching devices to the frame to be adjusted by the tilting of the frame upon its pivotal support.

3. An attachment for tractors including a frame of greater length than the over-all length of a tractor to which it is to be attached, means for pivotally attaching said frame to a tractor with the ends of the frame projecting beyond the ends of the tractor, means for tilting said frame longitudinally of the tractor upon its pivotal connection thereto, and means for connecting devices to the ends of said frame to be adjusted by the tilting of the frame.

4. An attachment for tractors including an open frame having longitudinal side members, means for pivotally attaching said frame intermediate its ends to a tractor with portions of the tractor projecting upwardly through the frame between the side members thereof with said members extending beyond the ends of the tractor, said means including brackets secured to the tractor and forming the sole means for pivotally supporting said frame with the side members thereof movable in vertical planes at opposite sides of the upwardly extending portion of the tractor, and means for swinging said frame upon its pivotal support.

5. An attachment for tractors comprising an open frame, means for pivotally attaching said frame to a tractor with portions of the tractor extending upwardly through said frame and an end of said frame extending beyond an end of the tractor, said frame being formed with a downwardly extending end portion at the extended end thereof beyond the end of the tractor, and means for tilting said frame upon its pivotal connection with the tractor, longitudinally thereof, to adjust implements attached to said downwardly extended end portion of the frame.

6. An attachment for tractors comprising a frame having side and transverse members, means for pivotally attaching said side members to a tractor with an end of said member extending beyond an end of the tractor, a downwardly extending end portion on the extended end of said frame, means for attaching implements to said downwardly extending portion to be carried thereby, and means carried by the cross members of the frame for tilting the frame upon its pivotal connections to the tractor, longitudinally of the tractor, to raise or lower implements carried by said downwardly extending end portion of the frame.

7. An attachment for tractors as characterized in claim 6 and wherein said frame is of greater length than the over-all length of the tractor, a downwardly extending portion at each end of the frame beyond the ends of the tractor for the attachment of implements thereto at both front and rear ends of the tractor.

8. An attachment as characterized in claim 6 and wherein said means for tilting said frame includes a screw shaft having a hand wheel and a nut to be engaged by said shaft, said nut having means for attaching the same to the rear end of the tractor.

In testimony whereof I affix my signature in presence of two witnesses.

FREDERICK A. TONEY.

Witnesses:
    LEWIS E. FLANDERS,
    KARL H. BUTLER.